United States Patent
Akiyama et al.

(10) Patent No.: US 7,167,205 B2
(45) Date of Patent: Jan. 23, 2007

(54) IMAGE PROCESSING APPARATUS FOR PRINT PROCESS OF PHOTOGRAPHED IMAGE

(75) Inventors: Yuji Akiyama, Kanagawa (JP); Makoto Torigoe, Tokyo (JP); Manabu Yamazoe, Tokyo (JP); Ryosuke Iguchi, Kanagawa (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/233,560

(22) Filed: Sep. 4, 2002

(65) Prior Publication Data

US 2003/0076420 A1    Apr. 24, 2003

(30) Foreign Application Priority Data

Sep. 6, 2001    (JP)    ............... 2001-270976

(51) Int. Cl.
*H04N 5/238* (2006.01)

(52) U.S. Cl. ............ 348/364; 348/224.1; 348/362

(58) Field of Classification Search ............ 348/222.1, 348/207.1, 207.2, 273.1, 224.1, 225.1, 362, 348/363, 364
See application file for complete search history.

(56) References Cited

U.S. PATENT DOCUMENTS

| 5,682,458 | A | 10/1997 | Funazaki | 386/123 |
|---|---|---|---|---|
| 5,739,924 | A | 4/1998 | Sano | 358/487 |
| 6,657,658 | B1* | 12/2003 | Takemura | 348/207.99 |
| 2001/0012096 | A1 | 8/2001 | Haraguchi et al. | 355/40 |
| 2002/0130959 | A1* | 9/2002 | McGarvey | 348/223 |
| 2003/0234866 | A1* | 12/2003 | Cutler | 348/207.1 |
| 2005/0024498 | A1* | 2/2005 | Iida et al. | 348/207.2 |

FOREIGN PATENT DOCUMENTS

| EP | 0 341 921 | 11/1989 |
|---|---|---|
| EP | 0 532 047 A2 | 3/1993 |
| EP | 1 128 660 A2 | 8/2001 |

* cited by examiner

*Primary Examiner*—Tuan Ho
(74) *Attorney, Agent, or Firm*—Fitzpatrick, Cella, Harper & Scinto

(57) ABSTRACT

An image processing method of performing various image correction processes to a photographed image and printing the photographed image comprises the steps of: inputting image information to which photographing condition information is added; analyzing the characteristic of the input image information; performing an image correction process of improving image quality to the photographed image on the basis of the characteristic of the analyzed image information; discriminating the photographing condition information added to the photographed image; and determining an image correction process to be performed in a step of performing the image correction process on the basis of the photographing condition information discriminated in the discriminating step, whereby it becomes possible to provide a high quality print-output result of reflecting the intention of a user at a time of photographing.

18 Claims, 7 Drawing Sheets

IMAGE PROCESSING APPARATUS FOR PRINT PROCESS OF PHOTOGRAPHED IMAGE

BACKGROUND OF THE INVENTION

1. Field of the Invention

The present invention relates to an image correction process for print-outputting, by a printer, digital image data obtained in a photographing operation by a digital still camera or the like.

2. Related Background Art

In recent years, with the spread of a digital still camera, digitization of photographed images comes into popular use. Especially, an opportunity of treating photographic images as digital image data on a personal computer increases. Furthermore, processing and editing can be easily performed to the digital image data being the photographic images by using various application software on the personal computer.

On the other hand, the technology in a full-color hardware copy is also rapidly progressed. Especially, in the print technology according to an ink jet system, image quality in a print-output result obtained by that system becomes the same as that in a print-output result obtained by a silver salt photographic method owing to improvement on technology of reducing granularity due to ink dots. Moreover, since the print technology according to the ink jet system is comparatively easy, this system has been widely spread.

According to such a technical background as above, it is required that the digital image data obtained by a photographing operation performed by the digital still camera can be easily print-output. With respect to an image correction process to be performed when image data is print-output, by using application software on the personal computer instead of performing a manual image correction process of using complicated functions, necessity of an automatic image correction process of always obtaining excellent images, to which the image correction process was performed, increases.

Therefore, in order to obtain an excellent print-output result, as a method of performing an image process such as the image correction process to image data and then print-outputting the processed data, there proposed various methods such as, for example, a method of analyzing a scene of a photographed image and automatically performing image correction on the basis of the analyzed result, and the like.

For example, there proposed a method related to so-called "density correction" being image correction of preventing an over-bright state (intensive pale color) or an over-dark state (intensive deep color) of a printed image when a photographed image is print-output. Also, there proposed a method related to so-called "image correction" of correcting an unpreferable image due to color fogging, defective exposure (defective lightness or defective contrast), defective saturation or the like on the photographed image and an image of defective color balance due to the color fogging or the like.

In either the image processing methods of "density correction" and "image correction", as the structure for the purpose of automatic image correction, such the structure characterized in that a histogram of accumulating the number of pixels of a target brightness value to each brightness value of a brightness signal in an image (original image) to be processed is used to analyze the original image, which is corrected on the basis of the analyzed result, is employed.

As functions of the digital still camera, not only a function of recording image data obtained by a photographing operation in a storage medium such as a memory card or the like as digital image data but also a function of recording additional information of indicating a photographing condition at a time of photographing in the storage medium together with the digital image data can be realized.

Incidentally, in the above conventional image processing method, in case of analyzing a scene of a target image by analyzing an image to be processed (target image) obtained by a photographing operation performed by the digital still camera and performing the automatic image correction of the target image based on the analyzed result, such the automatic image correction of printing an image (standardized image) theoretically considered as the optimum one for all the target images is to be performed basically.

However, in case of performing the above automatic image correction, correction against the intention of a user at a time of obtaining a target image (time of performing a photographic operation) is sometimes performed.

For example, for an image obtained by performing a photographing operation under an exposure condition intended by the user to increase or decrease lightness of the image, if the image is light, it is corrected to slightly decrease the lightness, and if the image is dark, it is corrected to slightly increase the lightness. That is, even if the target image is any kind of image, the image is corrected as one of standard lightness and is output.

Furthermore, for an image to which a specific effect has been aimed by intentionally varying white balance of the digital still camera by the user, image correction of obtaining the optimum color balance is performed similar to a case for an image which was obtained by an ordinary photographing operation.

On the other hand, although the digital still camera has a function of a photographing mode which obtains the optimum photographing condition for a scene to be photographed, a method of determining an image correction condition based on the photographing mode is considered. If information of a photographed scene is previously recognized, that is, if it is the photographed scene of scenery, person or the like is previously recognized, it is considered that correction of achieving more precise and preferable images can be realized.

However, actually, since it is impossible to surely judge that the photographed scene corresponds to what kind of scene from the analyzed result of the target image which was obtained by photographing, only such a countermeasure has been found in a prior art, wherein the corrected effect according to the automatic image correction is weakened so that the harmful effect for an image does not occur.

With the advance of functions of the digital still camera in recent years, for example, there finds such a camera in which a specific effective function of increasing saturation or variably changing contrast or lightness for an image obtained by a photographing operation is provided. However, if an image correction process is performed to an image, to which the specific effective function is used, there sometimes occurred a case of deteriorating quality of the processed image due to a fact that a specific effect by the specific effective function is lost or correction by the specific effective function becomes intensive owing to double corrections.

SUMMARY OF THE INVENTION

An object of the present invention is to provide an image processing apparatus and an image processing method of eliminating the above drawbacks.

Another object of the present invention is to provide an image processing method and an image processing apparatus capable of printing an image of which quality is intended by a photographer.

Still another object of the present invention is to provide an image processing method and an image processing apparatus capable of performing a print process by effectively utilizing photographing condition information added to an photographed image.

Still another object of the present invention is to provide an image processing method and an image processing apparatus capable of appropriately performing automatic correction at a time of printing an image.

Other objects of the present invention will become apparent from the description based on the following attached drawings and appended claims.

DETAILED DESCRIPTION OF THE PREFERRED EMBODIMENTS

Hereinafter, the embodiments of the present invention will be explained with reference to the accompanying drawings.

(First Embodiment)

Figure 1:
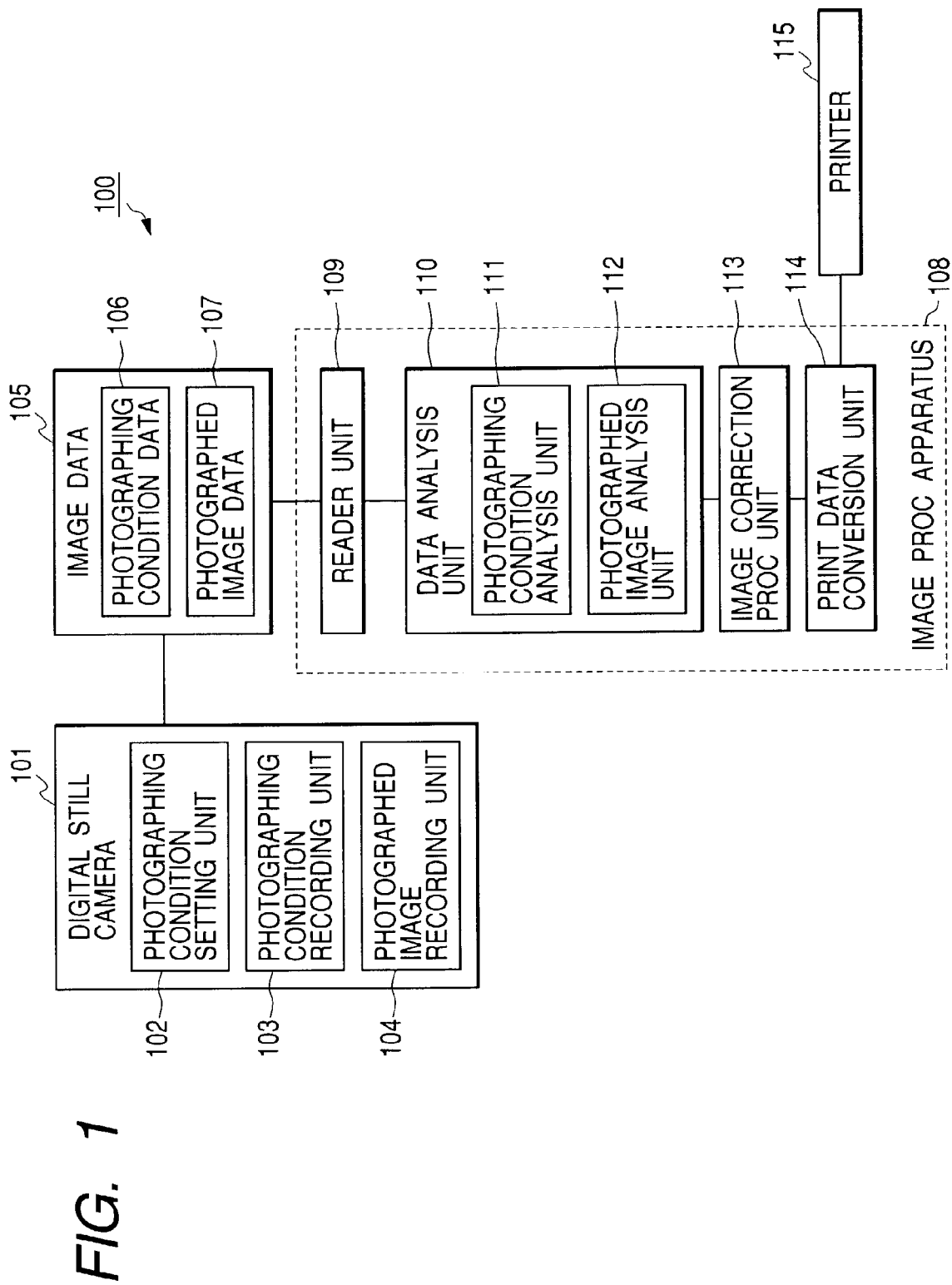
FIG. 1 is a block diagram showing the structure of an image printing system to which the present invention is applied in the first embodiment.

The present invention is applied to, e.g., an image printing system 100 as shown in FIG. 1. The image printing system 100 is structured to realize precise automatic image correction and provide a printed result of a high quality photographic image of further reflecting the intention of a user at a time of photographing by automatically performing image correction on the basis of an analyzed result of information (additional information) indicating a photographing condition added to image data to be processed obtained by a photographing operation performed by a digital still camera 101, to the image data.

Hereinafter, the structure and operation of the image printing system 100 according to the present embodiment will be concretely explained.

<Structure of Image Printing System 100>

The image printing system 100 is structured to include the digital still camera 101, an image processing apparatus 108 and a printer 115.

The digital still camera 101, which obtains photographed image data 107 by a photographing operation performed by a user and outputs image data 105 which includes photographing condition data 106 (additional information) in the photographing operation and the photographed image data 107 to the image processing apparatus 108, has a photographing condition setting unit 102, a photographing condition recording unit 103 and a photographed image recording unit 104.

The photographing condition setting unit 102 sets various photographing conditions necessary for the photographing operation. The photographing condition recording unit 103 records the photographing condition data 106 set by the photographing condition setting unit 102 into the image data 105 (data to be output to the image processing apparatus 108).

The photographed image recording unit 104 records the photographed image data 107 into the image data 105 in accordance with a photographing condition set by the photographing condition setting unit 102.

As a supplying method of supplying the image data 105 to the image processing apparatus 108, for example, a method of transferring data through a communication line such as a USB (Universal Serial Bus) or the like, a method of recording image data into a recording medium mounted on the digital still camera and delivering the recording medium or another method is applicable.

The image processing apparatus 108 which is, for example, composed of a personal computer performs an image correction process to the photographed image data 107 in the image data 105 sent from the digital still camera 101 according to activation of predetermined application software and a printer driver to perform print output by a printer 115.

Thus, the image processing apparatus 108 has a reader unit 109, a data analysis unit 110 which includes a photographing condition analysis unit 111 and a photographed image analysis unit 112, an image correction processing unit 113 and a print data conversion unit 114. Each function of the respective structural units 109 to 114 is realized by the activation of the predetermined application software and the printer driver.

The reader unit 109 reads the image data 105 sent from the digital still camera 101.

The data analysis unit 110 analyzes the photographing condition data 106 included in the image data 105 obtained by the reader unit 109 using the photographing condition analysis unit 111 and analyzes the photographed image data 107 obtained by the reader unit 109 using the photographed image analysis unit 112 then selects an image correction algorithm on the basis of the analyzed result.

The image correction processing unit 113 performs the image correction process to the photographed image data 107 according to the image correction algorithm selected in the data analysis unit 110.

As to selection (determination) of the image correction algorithm, for example, in a case where the photographed image analysis unit 112 analyzes a brightness value or a brightness distribution from a signal value of the photographed image data 107, the characteristic of the photographed image data 107 is recognized by the analyzed result, and the optimum correction condition corresponding to the recognized result is determined. Then, an image correction algorithm based on the determined condition is selected.

That is, selection of the final image correction algorithm is determined by an algorithm determined from the analyzed result of the photographing condition data 106 by the photographing condition analysis unit 111 and an algorithm determined from the characteristic recognition of the photographed image data 107 by the photographed image analysis unit 112.

As the image correction process, a brightness correction process, a contrast correction process, a color correction process, a saturation correction process, a smoothing process, an edge emphasis process, a noise reduction process or the like is enumerated. However, the image correction process is not limited to the above.

The print data conversion unit 114 converts the photographed image data 107 corrected in the image correction processing unit 113 into appropriate format data (e.g., C, M, Y and K data) which can be printed in the printer 115 and transfers the converted data to the printer 115 through a predetermined interface.

Then, the printer 115 print-outputs the data transferred from the print data conversion unit 114 in the image processing apparatus 108.

As the printer 115, an ink jet system printer or the like of a serial scanning type is applicable.

In the present embodiment, the functions of the structural units 109 to 114 included in the image processing apparatus 108 are realized by activation of the application software operating on the personal computer. However, realizing of the functions is not limited to the above case but may be realized by, e.g., hardware. More particularly, the functions may be realized by form of a driver of the printer 115.

For example, in case of using the personal computer as the image processing apparatus 108, the image data 105 is stored in a storage medium such as a hard disk or the like in the image processing apparatus 108 or stored in a storage medium of another personal computer (including a server or the like) connected to the image processing apparatus 108, and then the stored image data may be processed in the image processing apparatus 108.

As to transfer of the image data 105 from the digital still camera 101 to the image processing apparatus 108 (in case of using the personal computer as the image processing apparatus 108, it is an inner storage medium or the like), a method of utilizing an arbitrary communication line or the recording medium is applicable as above. However, more particularly, a card reader, a cable connection, an infrared communication or a wireless communication is applicable. In this case, for example, the digital still camera 101 is connected with the image processing apparatus 108 by the cable connection, the infrared communication or the wireless communication, and it may be structured that the image processing apparatus 108 directly reads the image data 105 from a memory card, a built-in memory or the like held in the digital still camera 101.

As the form of the image printing system 100, for example, it may be structured that the function of the image processing apparatus 108 is to be provided in the printer 115. In this case, the personal computer or the like has not to be used as the image printing system 100. Furthermore, in this case, for example, the image data 105 may be read in the printer 115 by data reading means (corresponding to the function of the reader unit 109) such as the card reader or the like provided in the printer 115 through the recording medium such as the memory card or the like. Besides, the digital still camera 101 is connected with the printer 115 by a wired cable, the infrared communication or the wireless communication, and it may be structured that the printer 115 reads the image data 105 from the memory card, the built-in memory or the like held in the digital still camera 101.

<Format of Image Data 105>

The format of the image data 105 means a recording format in case of recording the image data 105 in an arbitrary recording medium or a format in case of transferring the image data 105 to the image processing apparatus 108 in the digital still camera 101.

The image data 105 is, for example, structured by a tag area 106a being a recording area of the photographing condition data 106 and a photographed image data area 107a being a recording area of the photographed image data 107.

As the image data 105, it may be data in a compressed format state or data of an uncompressed format. In case of compressing the image data 105, partial compression may be performed in a manner that the photographing condition data 106 is not compressed and the photographed image data 107 is compressed. As a color space of the photographed image data 107, RGB data or YCC (brightness color difference) data may be used. For example, when the YCC data is to be used as the photographed image data 107, a conversion from the YCC data to the RGB data is performed in the reader unit 109 in the image processing apparatus 108.

In the tag area 106a of the image data 105, the photographing condition data 106 is recorded in a portion of offsetting a predetermined data amount form a head of the area. The photographing condition data 106 (photographing condition information of the digital still camera 101) corresponds to data regarding exposure, a stroboscope, white balance, a photographing mode and the like, and format of the data can be held in common between the digital still camera 101 being a data input side and the printer 115 being a data output side.

Figure 2:
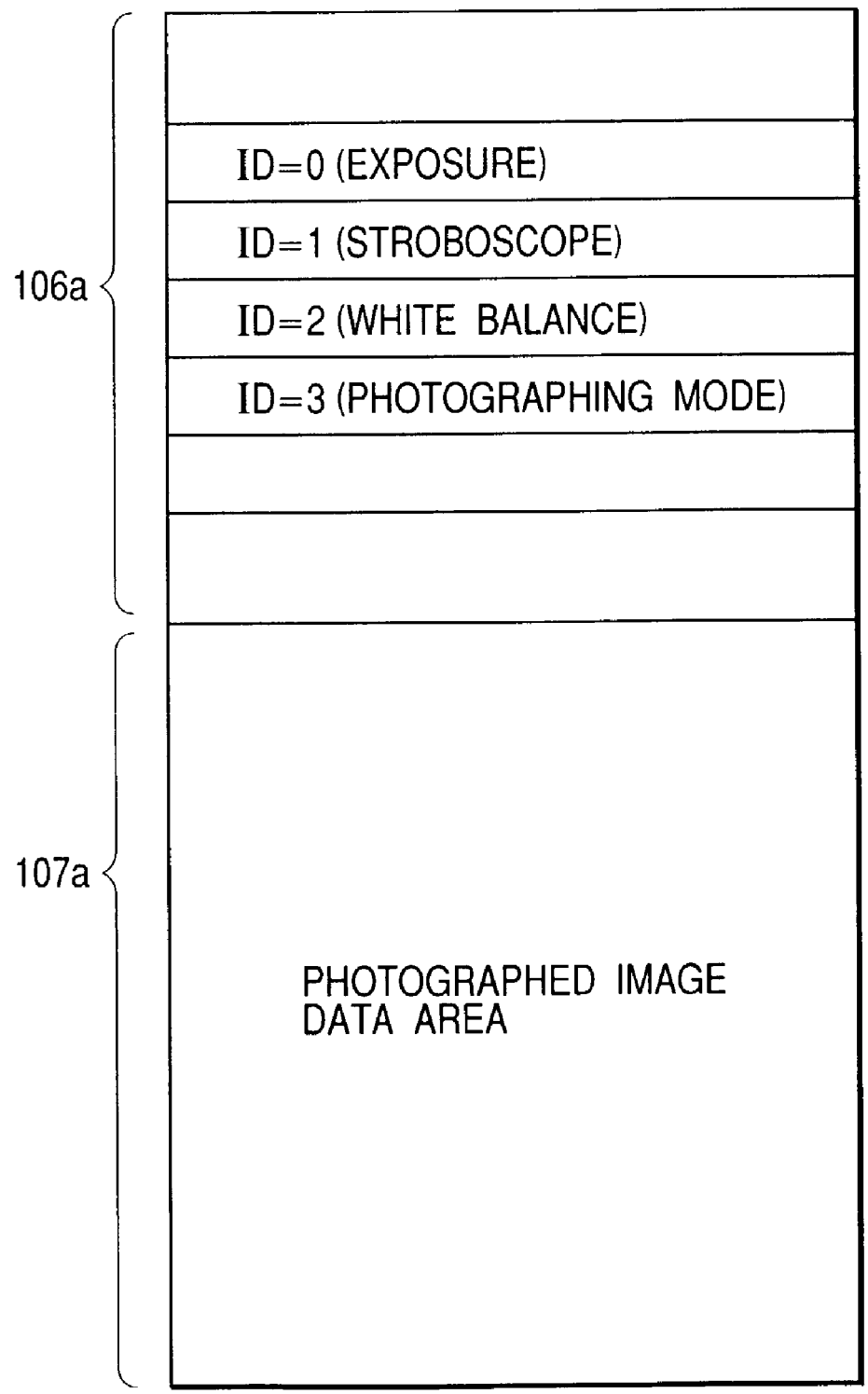
FIG. 2 is a view for explaining image data to be processed in the image printing system.

As the photographing condition data 106, it includes information of ID=0 to 3 as shown in FIG. 2.

The information of ID=0 (offset=n) indicates information regarding the exposure.

For example, in the digital still camera 101, when the photographed image data 107 is obtained by a photographing operation according to an automatic exposure mode, in the corresponded photographing condition data 106, a parameter "0" is set for ID=0. On the other hand, when the photographed image data 107 is obtained by a photographing operation according to a manual exposure mode, in the corresponded photographing condition data 106, a parameter "1" is set for ID=0.

The information of ID=1 (offset=n+1) indicates information regarding the stroboscope.

For example, in the digital still camera 101, when the photographed image data 107 is obtained in a state that the stroboscope does not flash, in the corresponded photographing condition data 106, a parameter "0" is set for ID=1. On the other hand, when the photographed image data 107 is obtained in a state that the stroboscope flashes, in the corresponded photographing condition data 106, a parameter "1" is set for ID=1.

The information of ID=2 (offset=n+2) indicates information regarding the white balance.

For example, in the digital still camera 101, when the photographed image data 107 is obtained in a state of an automatic white balance mode, in the corresponded photographing condition data 106, a parameter "0" is set for ID=2. On the other hand, when the photographed image data 107 is obtained in a state of a manual white balance mode, in the corresponded photographing condition data 106, a parameter "1" is set for ID=2.

The information of ID=3 (offset=n+3) indicates information regarding the photographing mode.

For example, in the image processing apparatus 108, when an image correction process in case of print-outputting the photographed image data 107 is inhibited, a parameter "0" indicating "effect inhibition" is set for ID=3. This parameter is set when an image editing process was performed in the digital still camera 101. On the other hand, in the image processing apparatus 108, when the image correction process in case of print-outputting the photographed image data 107 is made to be effective, a parameter "1" indicating "standard" is set for ID=3. In the digital still camera 101, when the photographed image data 107 is obtained by a "scenery" mode, a parameter "2" is set for ID=3. In the digital still camera 101, when the photographed image data 107 is obtained by a "person" mode, a parameter "3" is set for ID=3.

<Operation of Image Processing Apparatus 108>

Figure 3:
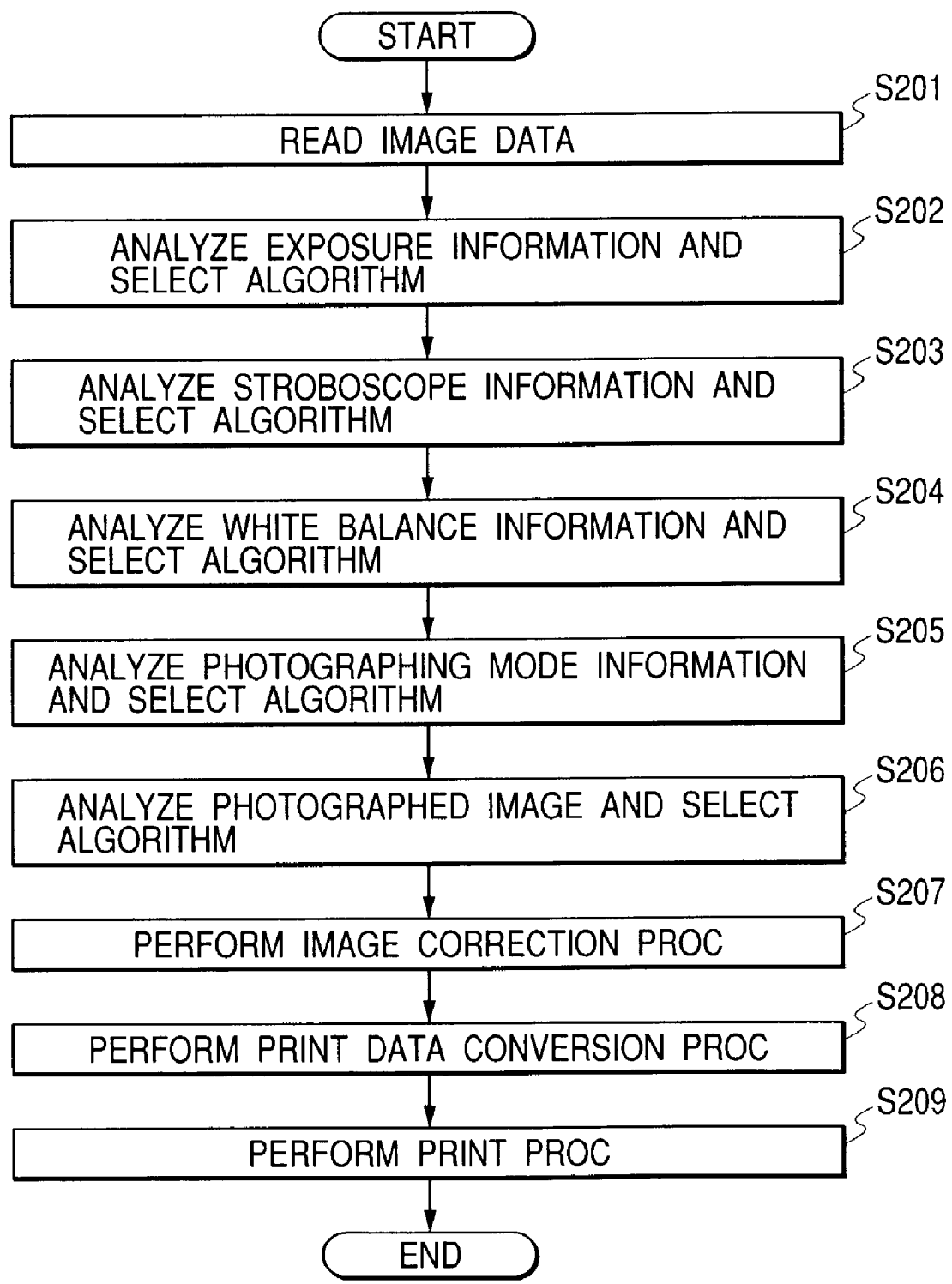
FIG. 3 is a flow chart for explaining an operation of an image processing apparatus in the image printing system.

FIG. 3 shows an operation of the image processing apparatus by a flow chart.

Step S201:

The reader unit 109 reads the image data 105 to be printed.

Step S202:

The data analysis unit 110 analyzes the information of ID=0 (exposure information) in the photographing condition data 106 in the image data 105 obtained by the reader unit 109 by using the photographing condition analysis unit 111. On the basis of the analyzed result, an image correction algorithm for performing image correction of the photographed image data 107 is selected.

More particularly, when a parameter for the information of ID=0 indicates "automatic exposure", an image correction algorithm for performing an image correction process of correcting brightness is selected so as to correct exposure deficiency or overexposure. On the other hand, when the parameter indicates "manual exposure", an image correction algorithm not for performing an image correction process regarding brightness is selected. Therefore, it can be prevented that brightness of the photographed image is corrected against the intention of a user at a time of photographing.

Step S203:

The data analysis unit 110 analyzes the information of ID=1 (stroboscope information) in the photographing condition data 106 in the image data 105 obtained by the reader unit 109 by using the photographing condition analysis unit 111. On the basis of the analyzed result, an image correction algorithm for performing an image correction of the photographed image data 107 is selected.

More particularly, when a parameter for the information of ID=1 indicates "stroboscope flashing", an image correction algorithm for performing a process of correcting contrast is selected. On the other hand, when the parameter indicates "stroboscope unflashing", an image correction algorithm not for performing an image correction process regarding contrast is selected. Therefore, the optimum image correction can be performed to a photographed image obtained by a photographing operation of flashing or unflashing the stroboscope.

Step S204:

The data analysis unit 110 analyzes the information of ID=2 (white balance information) in the photographing condition data 106 in the image data 105 obtained by the reader unit 109 by using the photographing condition analysis unit 111. On the basis of the analyzed result, an image correction algorithm for performing image correction of the photographed image data 107 is selected.

More particularly, when a parameter for the information of ID=2 indicates "automatic white balance", an image correction algorithm for performing color balance correction of adjusting the photographed image data to an appropriate white balance is selected. On the other hand, when the parameter indicates "manual white balance", an image correction algorithm not for performing an image correction process regarding color balance is selected. Therefore, it can be prevented that the color balance is corrected against the intention of the user at a time of photographing.

Step S205:

The data analysis unit 110 analyzes the information of ID=3 (photographing mode information) in the photographing condition data 106 in the image data 105 obtained by the reader unit 109 by using the photographing condition analysis unit 111. On the basis of the analyzed result, an image correction algorithm for performing image correction of the photographed image data 107 is selected.

More particularly, when a parameter for the information of ID=3 indicates "standard", an image correction algorithm for performing automatic image correction of standard setting is selected. When the parameter for the information of ID=3 indicates "effect inhibition", an image correction algorithm not for performing a specific image correction process is selected. When the parameter for the information of ID=3 indicates "scenery", an image correction algorithm of increasing saturation which becomes more intensive than that in a case of "standard" is selected. When the parameter for the information of ID=3 indicates "person", an image correction algorithm for performing an image correction process by which skin color in an image is preferably printed is selected. According to the above process, the optimum image correction corresponding to the scene to be photographed can be performed. Furthermore, it can be previously prevented that when a specific effect has been already performed (in case of "effect inhibition") in the digital still camera 101, if the image correction is performed at a time of printing, image quality is further deteriorated by the double processes.

Step S206:

The data analysis unit 110 analyzes the photographed image data 107 itself in the image data 105 obtained by the reader unit 109 by using the photographed image analysis unit 112. On the basis of the analyzed result, an algorithm of realizing the optimum condition when the photographed image data 107 is print-output is selected.

Here, selection of the algorithm is performed under the consideration of the image correction algorithm selected in each of the steps S202 to S205.

Step S207:

The image correction processing unit 113 performs an image correction process of the photographed image data 107 in accordance with the algorithm selected by the data analysis unit 110 in each of the steps S202 to S206.

Step S208:

The print data conversion unit 114 converts the photographed image data 107 which was processed in the image correction processing unit 113 into data of which format can be printed by the printer 115.

Step S209:

The printer 115 print-outputs the photographed image data 107 (data to which a conversion process was performed in the print data conversion unit 114), which was processed as described above in the image processing apparatus 108.

According to the above present embodiment, a precise automatic image correction process utilizing the photographing condition data 106 of indicating the photographed image data 107 and a photographing condition thereof can be realized when the photographed image data 107 is print-output. Therefore, it becomes possible to provide a high quality print-output result (printed result of a photographic image) of reflecting the intention of a user at a time of photographing.

As to the photographing condition data 106, it is not limited to the various information as shown in FIG. 2 but may be information which can specify the intention of the user at a time of photographing or a photographing scene. Furthermore, for example, information of indicating the characteristic at a time of obtaining the photographed image can be also utilized as the photographing condition data 106.

As to the content of the image correction process performed on the basis of the analyzed result of the photographing condition data 106, it may be the optimum image correction process corresponding to the characteristic or the like of the printer 115 used in performing print output but it is not limited to the above process.

Furthermore, in the present embodiment, when the photographing condition information regarding the exposure mode indicates "manual exposure", the image correction algorithm not for performing the image correction process regarding brightness is selected. Alternatively, it is possible to weaken the effect of the image correction process regarding brightness as compared with the case of "automatic exposure". This is similar for other parameters.

Furthermore, the present invention is not limited to the present embodiment, but various modifications can be performed within a range of not exceeding substance of the present invention.

(Second Embodiment)

Figure 4:
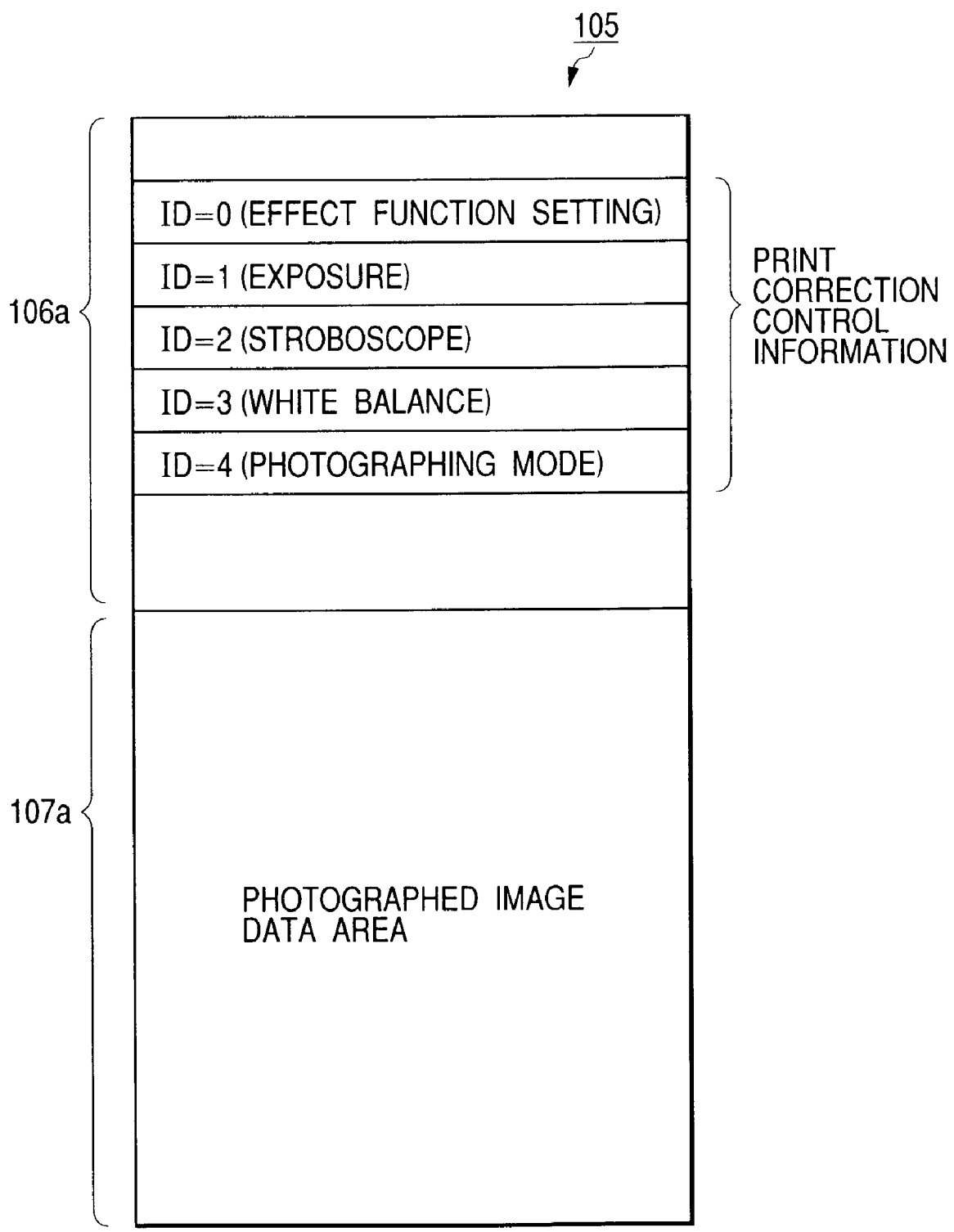
FIG. 4 is a view for explaining the image data in the second embodiment.

In the present embodiment, format data of the image data 105 is reformed to format data shown in FIG. 4 in the image printing system 100 of FIG. 1.

Incidentally, only the structure and the operation different from those in the first embodiment will be concretely explained in the present embodiment.

Concretely, the image data 105 is structured by a tag area 106a being a recording area of the photographing condition data 106 and a photographed image data area 107a being a recording area of the photographed image data 107 as shown in FIG. 4 similar to the case of the first embodiment.

In the tag area 106a of the image data 105, the photographing condition data 106 is recorded in a portion of offsetting a predetermined data amount form a head of the area. The photographing condition data 106a (photographing condition information of the digital still camera 101) corresponds to data regarding information of setting a correction effective function or the like in addition to exposure, a stroboscope, white balance and a photographing mode, and format of the data can be held in common between the digital still camera 101 being a data input side and the printer 115 being a data output side.

A point different from that in the first embodiment is that the information of setting the correction effective function is to be included for the photographing condition data 106.

The information of setting the correction effective function is indicated by ID=0 (offset=n). For example, when an image correction process in case of print-outputting the photographed image data 107 is inhibited in the image processing apparatus 108, a parameter "0" indicating "inhibition" is set for the information of ID=0. On the other hand, when the image correction process in case of print-outputting the photographed image data 107 is made to be effective in the image processing apparatus 108, a parameter "1" indicating "effective" is set for the information of ID=0.

By providing such the parameters for the information of ID=0, it can be prevented that image quality is deteriorated by the double processes if the image correction is performed in the image processing apparatus 108 when image data, to which a specific effective correction has been already performed in the digital still camera 101 at a time of photographing, is print-output by the printer 115.

As to information thereafter continued from information of ID=1, ID=1 (offset=n+1) indicates information regarding exposure.

Information of ID=2 (offset=n+2) indicates information regarding a stroboscope.

Information of ID=3 (offset=n+3) indicates information regarding white balance.

Information of ID=4 (offset=n+4) indicates information regarding a photographing mode.

The details of the information from ID=1 to ID=4 are the same as those in the first embodiment.

Figure 5:
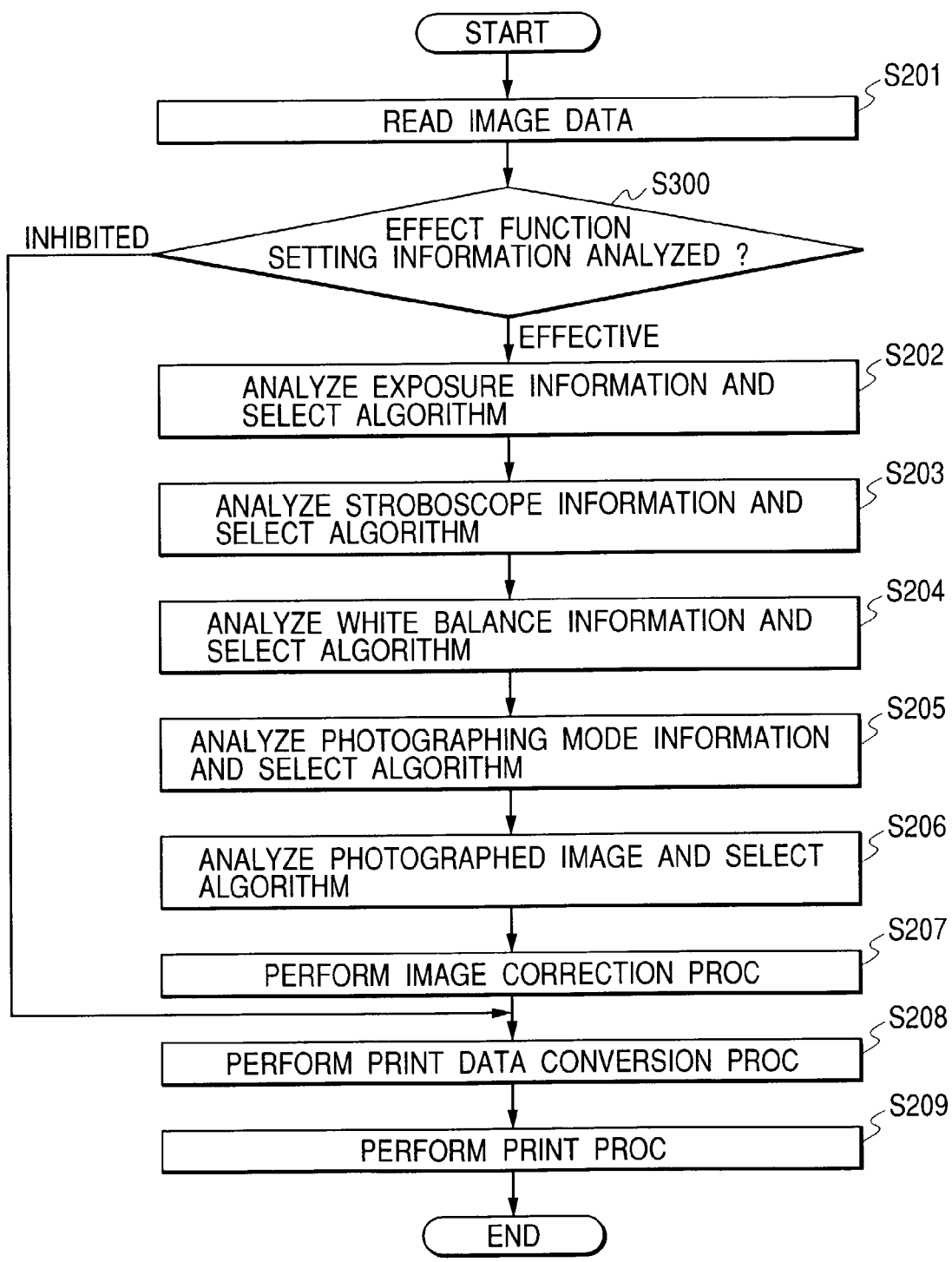
FIG. 5 is a flow chart for explaining an operation of the image processing apparatus in the second embodiment.

FIG. 5 shows an operation of the image processing apparatus 108 in the present embodiment by a flow chart.

In the flow chart shown in FIG. 5, identical reference symbols are given to steps which perform the same processes as those in the flow chart (a flow chart indicating an operation of the image processing apparatus 108 in the first embodiment) shown in FIG. 3, and the detailed description thereof will be omitted.

In the present embodiment, it is structured to add a process to be performed in a step S300 to the operation performed in the first embodiment.

Step 300:

First, similar to the first embodiment, when the image data 105 is read by the reader unit 109 (step S201), the data analysis unit 110 analyzes the information of ID=0 (effective function setting information) in the photographing condition data 106 in the image data 105 obtained by the reader unit 109 by using the photographing condition analysis unit 111. On the basis of the analyzed result, it is discriminated if a parameter indicates "effective" or "inhibition".

As a result of this discrimination, when the parameter indicates "effective", the image correction processes according to the steps S202 to S207 are performed similar to the case of the first embodiment. Then, a print process is performed in the steps S208 and S209. On the other hand, the parameter indicates "inhibition", the image correction processes according to the steps S202 to S207 are not performed, and the print process is performed as it is in the steps S208 and S209.

As above, in the present embodiment, when the parameter for the information of ID=0 (effective function setting information) in the photographing condition data 106 indicates "ineffective", the whole image correction processes are not performed, and the print process for an image is performed as it is.

According to the present embodiment, like the first embodiment, it can be realized to perform a precise automatic image correction process utilizing the photographed image data 107 and the photographing condition data 106 being additional information of indicating a photographing condition thereof when the photographed image data 107 is print-output. As a result, it can be realized to provide a high quality print-output result (printed result of a photographic image) of reflecting the intention of a user at a time of photographing.

(Third Embodiment)

Figure 6:
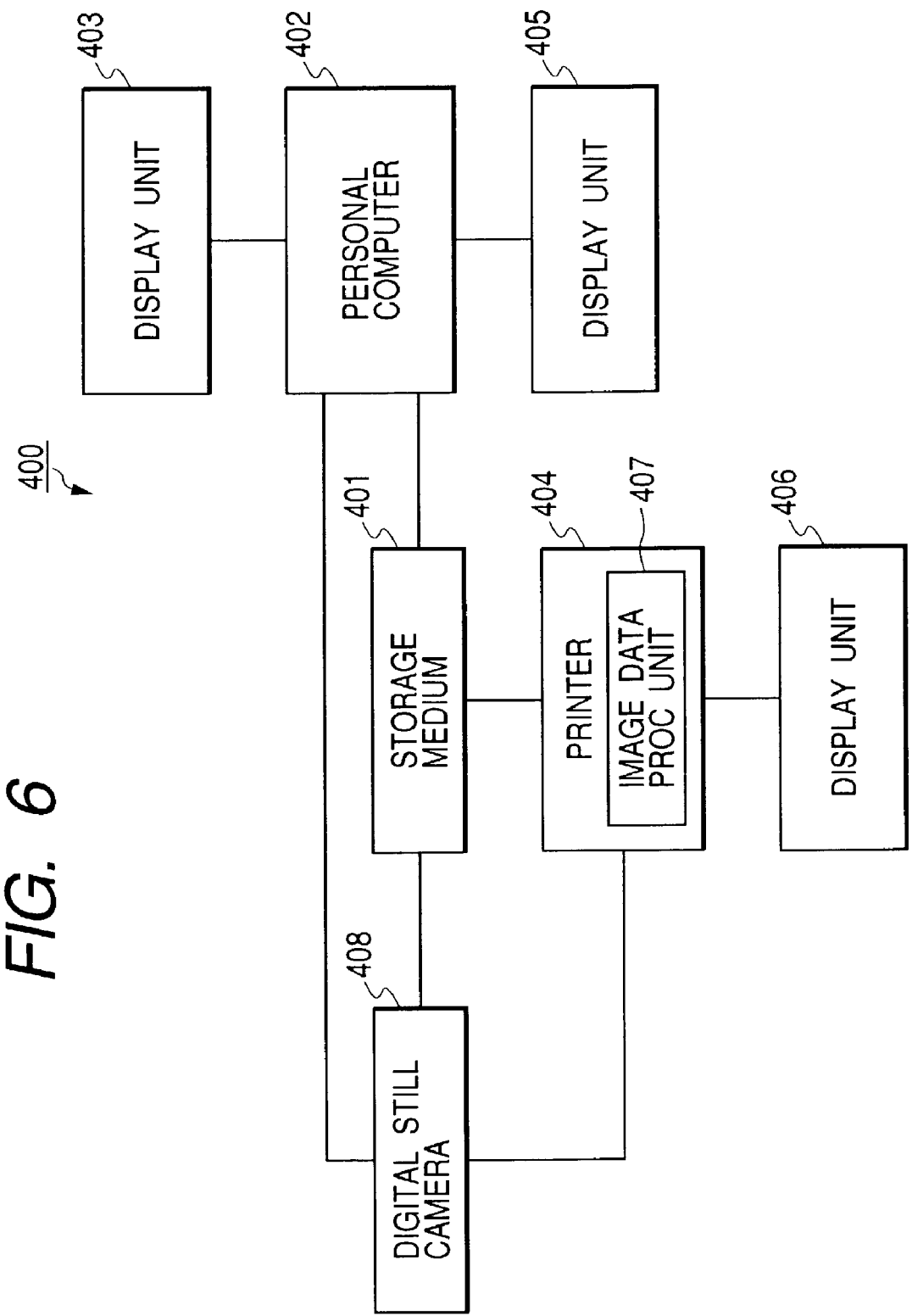
FIG. 6 is a block diagram showing the structure of an image printing system to which the present invention is applied in a third embodiment.

For example, the present invention is applied to an image printing system 400 as shown in FIG. 6. Since the image correction process in the first or second embodiment is applied to the image printing system 400 of the present embodiment, the detailed explanation of the image correction process will be omitted.

The image printing system 400 is structured to include a digital still camera 408, a printer 404 having a display unit 406 and a personal computer 402 having a display unit 403 and a printer 405.

Communication of data between the digital still camera 408 and the personal computer 402, and the digital still camera 408 and the printer 404 can be performed through a storage medium 401.

In the above image printing system 400, the digital still camera 408 has the same function as that of the digital still camera 101 shown in FIG. 1, and the image data 105 as shown in FIGS. 2 or 4 is generated by a photographing operation performed by a user. Then, the image data 105 is made to be stored in the storage medium 401.

As the storage medium 401, it is not limited to specific one, but a memory card or a built-in memory held by the digital still camera 408, a detachable memory card, a hard disk in the personal computer 402, or the like is applicable.

The printer 404 includes an image data processing unit 407 having the image correcting function (function of the image processing apparatus 108 shown in FIG. 1) in the first or second embodiment.

Thus, for example, the printer 404 reads the image data 105 from the storage medium 401 by the image data processing unit 407 (concretely, it corresponds to the reader unit 109 shown in FIG. 1) or directly reads the image data 105 from the memory card or the built-in memory held by the digital still camera 408 connected by a wired cable, an infrared communication or a wireless communication.

The printer 404 can display the image data 105 which was processed in the image data processing unit 407 on the display unit 406 for confirmation.

The personal computer 402 which has the same function as that of the image processing apparatus 108 shown in FIG. 1 processes the image data 105 stored in the storage medium 401, then print output is performed by the printer 405.

The image data 105 to be processed by the personal computer 402 is not limited to one stored in the storage medium 401 but, for example, data stored in a storage medium such as the hard disk or the like in the personal computer 402 or stored in a storage medium in another personal computer (including a server or the like) connected to the personal computer 402 is applicable. As the transfer method of the image data 105, it is not limited to the method of using the storage medium 401 but method of depending on, e.g., a card reader, a cable connection, the infrared communication or the wireless communication is applicable. In this case, the digital still camera 408 is connected to the personal computer 402 by the cable connection, the infrared communication or the wireless communication, and it may be structured that the personal computer 402 directly reads the image data 105 from the memory card or the built-in memory held by the digital still camera 408.

The personal computer 402 can display the processed image data 105 on the display unit 403 for confirmation.

Figure 7:
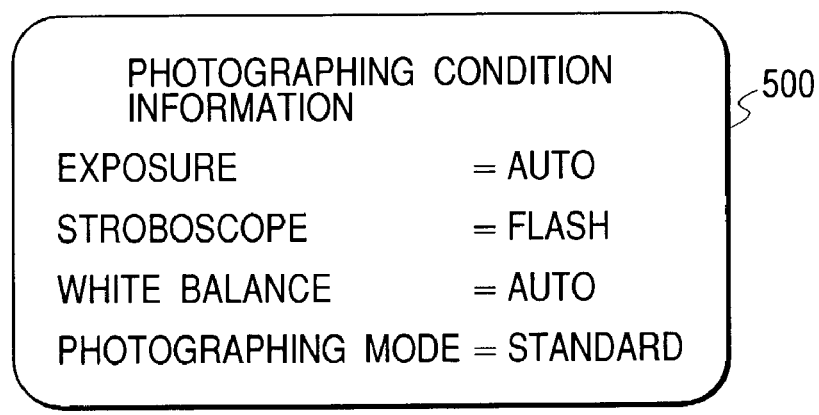
FIG. 7 is a view for explaining an example of a display screen in the image printing system.

FIG. 7 shows an example of a display screen 500 displayed on the display unit 406 of the printer 404 or the display unit 403 of the personal computer 402.

As shown in FIG. 7, photographing condition information (information corresponding to the photographing condition data 106 shown in FIG. 2 or FIG. 4) such as exposure, a stroboscope, white balance, a photographing mode and the like are displayed on the display screen 500.

Especially, the display screen 500 is displayed when an image correction process for a print process of the image data 105 is performed in the printer 404 or the personal computer 402. Therefore, a user can easily confirm if the image correction is performed based on what kind of the photographing condition information and also easily confirm that the photographing condition information is correctly utilized for the image correction.

In the third embodiment, the photographing condition information was to be displayed on a screen. However, it is not limited to this method but it may be indicated by an on/off operation of the light, or the like that the photographing condition information is correctly utilized.

The present invention is not limited to the first to third embodiments, but various modifications can be performed within a range of not exceeding substance of the present invention.

In the first to third embodiments, as input means (obtaining means) for inputting image data, the digital still camera is used as one example. However, it is not limited to this means but an input device such as a digital video camera, an image scanner, a film scanner, or the like is available.

It is needless to say that the present invention can be achieved in a case that a storage medium storing the program codes of software for realizing the functions of a host computer and terminal devices of the first to third embodiments is supplied to a system or an apparatus and then a computer (or CPU or MPU) in the system or the apparatus reads and performs the program codes stored in the storage medium.

In this case, the program codes themselves read from the storage medium realize the functions of the first to third embodiments, and the storage medium storing such the program codes and the program codes constitute the present invention.

The storage medium for supplying the program codes can be, e.g., a ROM, a flexible disk, a hard disk, an optical disk, a magneto-optical disk, a CD-ROM, a CD-R, a magnetic tape, a non-volatile memory card or the like.

It is needless to say that the present invention also includes not only a case where the functions of the first to third embodiments are realized by the execution of the program codes read by the computer, but also a case where an OS (operating system) or the like functioning on the computer performs all the actual process or a part thereof according to the instructions of the program codes, thereby realizing the functions of the first to third embodiments Further, it is needless to say that the present invention includes a case where the program codes read from the storage medium are once written in a memory provided in a function expansion board inserted in the computer or a function expansion unit connected to the computer, and a CPU or the like provided in the function expansion board or the function expansion unit performs all the actual process or a part thereof according to the instructions of the program codes, thereby realizing the functions of the first to third embodiments.

Figure 8:
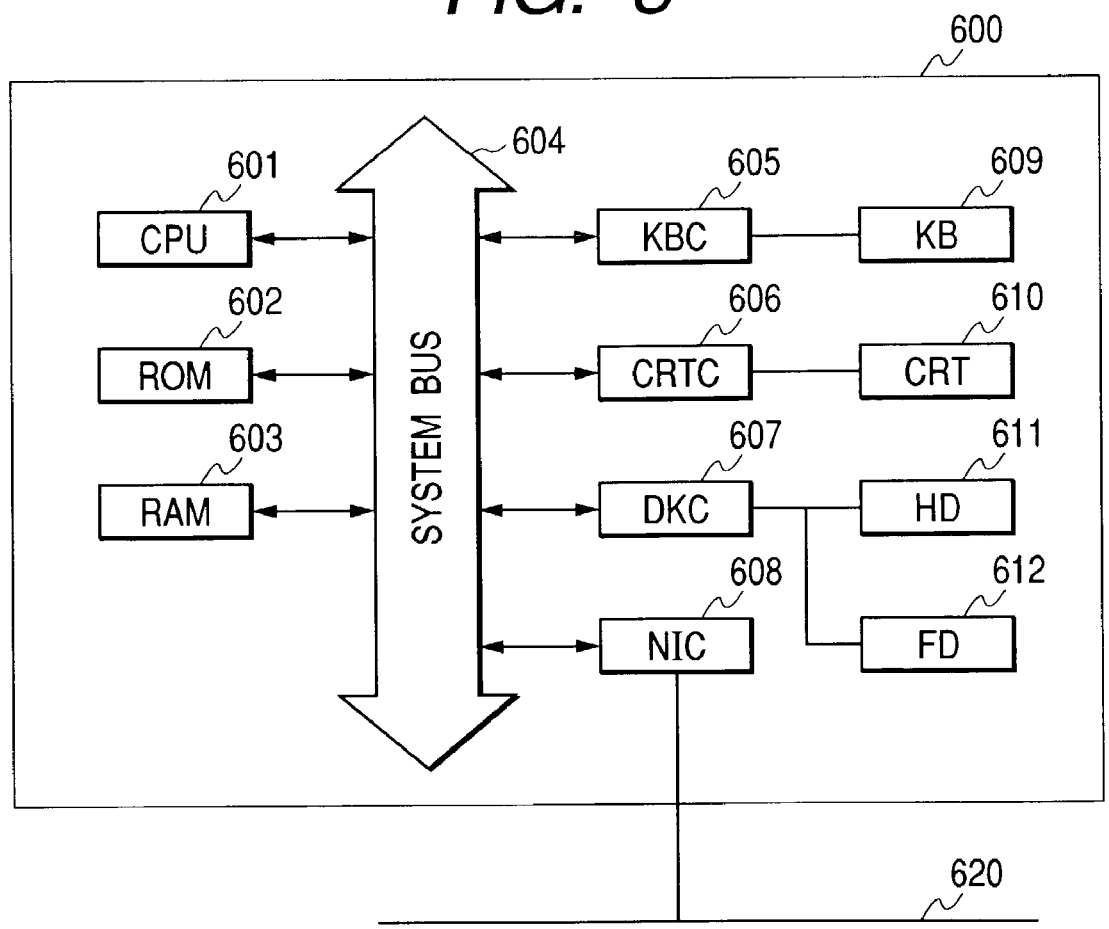
FIG. 8 is a block diagram showing the structure of a computer which reads programs for causing the computer to realize functions of the image printing system from a computer-readable storage medium and executes the programs.

FIG. 8 shows a function 600 of the above computer. As shown in FIG. 8, the computer function 600 is structured that a CPU 601, a ROM 602, a RAM 603, a keyboard controller (KBC) 605 for a keyboard (KB) 609, a CRT controller (CRTC) 606 for a CRT display (CRT) 610 which serves as a display unit, a disk controller (DKC) 607 for a hard disk (HD) 611 and a flexible disk (FD) 612 and a network interface controller (NIC) 608 used for connecting to a network 620 are mutually connected through a system bus 604 so that the communication can be performed.

The CPU 601 totally controls each of the structural units connected to the system bus 604 by executing the software stored in the ROM 602 or the HD 611 or the software supplied from the FD 612.

That is, the CPU 601 performs a control of realizing an operation to be performed in the present embodiment by reading a processing program according to a predetermined processing sequence from the ROM 602, the HD 611 or the FD 612 and executing that program.

The RAM 603 functions as a main memory, a work area or the like of the CPU 601. The KBC 605 controls an instruction input instructed from the KB 609, a pointing device (not shown) or the like. The CRTC 606 controls a display of the CRT 610. The DKC 607 controls an access to the HD 611 and the FD 612 which store a boot program, various application software, an editing file, a user file, a network management program, a predetermined processing program in the present embodiment, and the like. The NIC 608 interactively performs a data communication with apparatuses on a network 620 or the system.

What is claimed is:

1. An image processing method which performs various image correction processes to a photographed image and prints the photographed image, comprising the steps of:
    inputting image information to which photographing condition information is added;
    analyzing the characteristic of the input image information;
    performing an image correction process on the photographed image on the basis of the characteristic of the analyzed image information;
    discriminating the photographing condition information added to the photographed image; and
    determining an image correction process to be performed in a step of performing the image correction process on the basis of the photographing condition information discriminated in said discriminating step, wherein it is discriminated whether the photographing condition information regarding exposure of the photographed image is automatic exposure or manual exposure in said discriminating step, if it is discriminated that it is the automatic exposure, an image correction algorithm of performing an image correction process regarding brightness is selected, and if it is discriminated that it is the manual exposure, an image correction algorithm of not performing the image correction process regarding brightness is selected in said determining step.

2. A method according to claim 1, wherein a brightness value and a brightness distribution of the photographed image are analyzed in said analyzing step.

3. An image processing method which performs various image correction processes to a photographed image and prints the photographed image, comprising the steps of:
    inputting image information to which photographing condition information is added;
    analyzing the characteristic of the input image information;
    performing an image correction process on the photographed image on the basis of the characteristic of the analyzed image information;
    discriminating the photographing condition information added to the photographed image; and
    determining an image correction process to be performed in a step of performing the image correction process on the basis of the photographing condition information discriminated in said discriminating step, wherein it is discriminated whether the photographing condition information regarding a stroboscope flash of the photographed image is stroboscope flashing or stroboscope unflashing in said discriminating step, if it is discriminated that it is the stroboscope flashing, an image correction algorithm of performing a process for correcting contrast is selected, and if it is discriminated that it is the stroboscope unflashing, an image correction algorithm of not performing the process for correcting the contrast is selected in said determining step.

4. A method according to claim 3, wherein a brightness value and a brightness distribution of the photographed image are analyzed in said analyzing step.

5. An image processing method which performs various image correction processes to a photographed image and prints the photographed image, comprising the steps of:
    inputting image information to which photographing condition information is added;
    analyzing the characteristic of the input image information;
    performing an image correction process on the photographed image on the basis of the characteristic of the analyzed image information;
    discriminating the photographing condition information added to the photographed image; and
    determining an image correction process to be performed in a step of performing the image correction process on the basis of the photographing condition information discriminated in said discriminating step, wherein it is discriminated whether the photographing condition information regarding white balance or manual white balance in said discriminating step, if it is discriminated that it is the automatic white balance, an image correction algorithm of performing color balance correction is selected, and if it is discriminated that it is the manual white balance, an image correction algorithm of not performing the color balance correction is selected in said determining step.

6. A method according to claim 5, wherein a brightness value and a brightness distribution of the photographed image are analyzed in said analyzing step.

7. An image processing method which performs various image correction processes to a photographed image and prints the photographed image, comprising the steps of:
    inputting image information to which photographing condition information is added;
    analyzing the characteristic of the input image information;
    performing an image correction process on the photographed image on the basis of the characteristic of the analyzed image information;
    discriminating the photographing condition information added to the photographed image; and
    determining an image correction process to be performed in a step of performing the image correction process on the basis of the photographing condition information discriminated in said discriminating step, wherein the photographing condition information regarding a photographing mode of the photographed image is discriminated in said discriminating step, if it is discriminated that it is a standard mode, an image correction algorithm of performing automatic image correction for standard setting is selected, if it is discriminated that it is a scenery mode, an image correction algorithm of increasing saturation which becomes more intensive than that in a case of the standard mode is selected, and if it is discriminated that it is a person mode, an image correction algorithm of optimizing skin color is selected in said determining step.

8. A method according to claim 7, wherein a brightness value and a brightness distribution of the photographed image are analyzed in said analyzing step.

9. An image processing method which performs various image correction processes to a photographed image and prints the photographed image, comprising the steps of:
inputting image information to which photographing condition information is added;
analyzing the characteristic of the input image information;
performing an image correction process on the photographed image on the basis of the characteristic of the analyzed image information;
discriminating the photographing condition information added to the photographed image; and
determining an image correction process to be performed in a step of performing the image correction process on the basis of the photographing condition information discriminated in said discriminating step, a brightness value and a brightness distribution of the photographed image are analyzed in said analyzing step.

10. An image processing apparatus comprising:
an image obtaining unit arranged to obtain a photographed image to which photographing condition information at a time of photograph is added;
a discrimination unit arranged to discriminate the photographing condition information;
an analysis unit arranged to analyze the characteristic of the photographed image;
an image correction unit arranged to perform a correction process on the photographed image on the basis of the characteristic analyzed by said analysis unit; and
a determination unit arranged to determine a correction process to be performed by said image correction unit on the basis of the photographing condition information analyzed by said unit, wherein said discrimination unit discriminates whether the photographing condition information regarding exposure of the photographed image is automatic exposure or manual exposure, if it is discriminated that it is the automatic exposure, said determination unit selects an image correction algorithm of performing an image correction process regarding brightness, and if it is discriminated that it is the manual exposure, said determination unit selects an image correction algorithm of not performing the image correction process regarding the brightness.

11. An apparatus according to claim 10, wherein said analysis unit analyzes a brightness value and a brightness distribution of the photographed image.

12. An image processing apparatus comprising:
an image obtaining unit arranged to obtain a photographed image to which photographing condition information at a time of photograph is added;
a discrimination unit arranged to discriminate the photographing condition information;
an analysis unit arranged to analyze the characteristic of the photographed image;
an image correction unit arranged to perform a correction process on the photographed image on the basis of the characteristic analyzed by said analysis unit; and
a determination unit arranged to determine a correction process to be performed by said image correction unit on the basis of the photographing condition information analyzed by said unit, wherein said discrimination unit discriminates whether the photographing condition information regarding a stroboscope flash of the photographed image is stroboscope flashing or stroboscope unflashing, if it is discriminated that it is the stroboscope flashing, said determination unit selects an image correction algorithm of performing a process for correcting contrast, and if it is discriminated that it is the stroboscope unflashing, said determination unit selects an image correction algorithm of not performing the process for correcting the contrast.

13. An apparatus according to claim 12, wherein said analysis unit analyzes a brightness value and a brightness distribution of the photographed image.

14. An image processing apparatus comprising:
an image obtaining unit arranged to obtain a photographed image to which photographing condition information at a time of photograph is added;
a discrimination unit arranged to discriminate the photographing condition information;
an analysis unit arranged to analyze the characteristic of the photographed image;
an image correction unit arranged to perform a correction process on the photographed image on the basis of the characteristic analyzed by said analysis unit; and
a determination unit arranged to determine a correction process to be performed by said image correction unit on the basis of the photographing condition information analyzed by said unit, wherein said discrimination unit discriminates whether the photographing condition information regarding white balance of the photographed image is automatic white balance or manual white balance, if it is discriminated that it is the automatic white balance, said determination unit selects an image correction algorithm of performing color balance correction, and if it is discriminated that it is the manual white balance, said determination unit selects an image correction algorithm of not performing the color balance correction.

15. An apparatus according to claim 14, wherein said analysis unit analyzes a brightness value and a brightness distribution of the photographed image.

16. An image processing apparatus comprising:
an image obtaining unit arranged to obtain a photographed image to which photographing condition information at a time of photograph is added;
a discrimination unit arranged to discriminate the photographing condition information;
an analysis unit arranged to analyze the characteristic of the photographed image;
an image correction unit arranged to perform a correction process on the photographed image on the basis of the characteristic analyzed by said analysis unit; and
a determination unit arranged to determine a correction process to be performed by said image correction unit on the basis of the photographing condition information analyzed by said unit, wherein said discrimination unit discriminates photographing condition information regarding a photographing mode of the photographed image, and said determination unit selects an image correction algorithm of performing automatic image correction for standard setting if it is discriminated that it is a standard mode, said determination unit selects an image correction algorithm of increasing saturation which becomes more intensive than that in a case of the standard mode if it is discriminated that it is a scenery mode, and said determination unit selects an image correction algorithm of optimizing skin color if it is discriminated that it is a person mode.

17. An apparatus according to claim 16, wherein said analysis unit analyzes a brightness value and a brightness distribution of the photographed image.

18. An image processing apparatus comprising:
  an image obtaining unit arranged to obtain a photographed image to which photographing condition information at a time of photograph is added;
  a discrimination unit arranged to discriminate the photographing condition information;
  an analysis unit arranged to analyze the characteristic of the photographed image;
  an image correction unit arranged to perform a correction process on the photographed image on the basis of the characteristic analyzed by said analysis unit; and
  a determination unit arranged to determine a correction process to be performed by said image correction unit on the basis of the photographing condition information analyzed by said unit, wherein said analysis unit analyzes a brightness value and a brightness distribution of the photographed image.

* * * * *

UNITED STATES PATENT AND TRADEMARK OFFICE
CERTIFICATE OF CORRECTION

PATENT NO. : 7,167,205 B2
APPLICATION NO. : 10/233560
DATED : January 23, 2007
INVENTOR(S) : Yuji Akiyama et al.

It is certified that error appears in the above-identified patent and that said Letters Patent is hereby corrected as shown below:

COLUMN 1

Line 43, "there proposed" should read --there are proposed--.
Line 47, "there proposed" should read --there is proposed--.
Line 51, "there proposed" should read --there is proposed--.
Line 58, "either" should read --either of--.
Line 60, "such the" should read --such--.

COLUMN 2

Line 7, "in case" should read --in the case--.
Line 11, "such the" should read --such--.
Line 15, "in case" should read --in the case--.
Line 30, "similar" should read --similarly--.
Line 39, "if it is" should read --if, for example,--.
Line 51, "there finds" should read --there is found--.
Line 66, "method of" should read --method capable of--.

COLUMN 3

Line 8, "to an" should read --to a--.

COLUMN 5

Line 29, "in case" should read --in the case--.
Line 39, "(in case" should read --(in the case--.
Line 56, "has not to be" should read --need not be--.

COLUMN 6

Line 3, "in ease" should read --in the case--.
Line 4, "in case" should read --in the case--.
Line 12, "In case" should read --In the case--.
Line 24, "form" should read --from--.

COLUMN 7

Line 2, "in case" should read --in the case--.
Line 8, "in case" should read --in the case--.

UNITED STATES PATENT AND TRADEMARK OFFICE
CERTIFICATE OF CORRECTION

PATENT NO. : 7,167,205 B2
APPLICATION NO. : 10/233560
DATED : January 23, 2007
INVENTOR(S) : Yuji Akiyama et al.

It is certified that error appears in the above-identified patent and that said Letters Patent is hereby corrected as shown below:

<u>COLUMN 8</u>

Line 36, "(in ease" should read --(in the case--.

<u>COLUMN 9</u>

Line 47, "form" should read --from--.
    Line 62, "in case" should read --in the case--.
    Line 66," in case" should read --in the case--.

<u>COLUMN 11</u>

Line 22, "specific" should read --any specific--.
    Line 52, "method" should read --a method--.

<u>COLUMN 12</u>

Line 8, "what kind" should read --the nature--.
    Line 36, "such the" should read --such--.
    Line 50, "embodiments" should read --embodiments.--.

Signed and Sealed this

Twentieth Day of November, 2007

JON W. DUDAS
*Director of the United States Patent and Trademark Office*